INVENTOR.
Arnold A. Shostak 3,434,138
RADIATING HORN ANTENNA WITH SOUND MODULATED LENS
Arnold A. Shostak, Arlington, Va., assignor to the United States of America as represented by the Secretary of the Navy
Filed July 15, 1966, Ser. No. 565,500
U.S. Cl. 343—754
Int. Cl. H01q *19/06*
6 Claims

ABSTRACT OF THE DISCLOSURE

There is disclosed an electromagnetic beam scanning arrangement wherein the radiating structure, which may be a wave guide horn, accommodates within its flared end portion an enclosed container filled with an electrolyte. Cooperating with the horn is a sound wave source and, by changing the direction in which the sound energy travels through the electrolyte, the direction of the emerging electromagnetic beam may be controlled.

---

Figure 1:
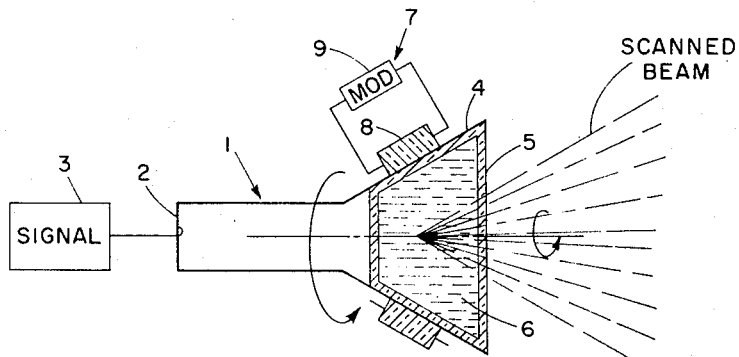

The invention described herein may be manufactured and used by or for the Government of the United States of America for governmental purposes without the payment of any royalties thereon or therefor.

The present invention relates generally to apparatus for and methods of systematically varying the direction of radiation of electromagnetic or sound wave energy and, more particularly, to beam scanning arrangements wherein the direction of radiation of the wave energy may be altered in a predetermined manner by a sound wave source which changes the transmission characteristics of a portion of the medium through which these wave energies travel.

Electromagnetic beams generally may be steered either electronically by selectively energizing the individual radiators of the antenna array through appropriate electrical signal delay networks or mechanically by moving either the radiator itself, where, for example, this apparatus is a wave guide horn, or a cooperating beam forming reflector. Both types of systems, however, require either complicated electrical control circuits or complex mechanical mechanisms.

It is well known that a sound disturbance produces a local variation in the density and temperature in the medium of propagation. This, in turn, gives rise to a variation in the complex refractive index of the material and influences, for example, the phase and direction of an electromagnetic wave traversing the perturbed medium. The acoustic wave thus acts essentially as a defracting phase grating that is moving constantly with the velocity of sound.

In accordance with one aspect of the present invention, an electromagnetic wave radiating structure, such as, for example, a wave guide horn, accommodates within its flared end portion an enclosed container filled with an electrolyte. Cooperating with this apparatus is a sound wave source which, when energized, transmits an acoustic wave through the electrolyte solution to alter its conductivity and/or polarizability and, hence, its complex index of refraction. When the electromagnetic energy encounters this perturbed region, its direction of propagation is modified, much like the Bragg reflection encountered in optics, and it emerges from the mouth of the horn in a direction determined by the parallel regions of increased and decreased pressure produced by the sound wave energy. By merely changing the direction in which this sound energy travels through the electrolyte and, hence, the angular relationship between the wave fronts of the electromagnetic and sound energy, the emerging electromagnetic beam may be directionally controlled. This technique may be employed to change either the direction of an electromagnetic beam or a sound beam. For the most effective operation, the acoustic wave employed as the direction modifying mechanism should have a wavelength which is an integral multiple of that of the electromagnetic energy as measured in the electrolyte.

A primary object of the present invention is to provide an arrangement for systematically changing the direction of radiaion of an electromagnetic energy beam to achieve a scanning motion.

Another object of the present invention is to provide a method for steering an electromagnetic energy beam which utilizes a complementary sound beam that is directed at different angles through an electrolyte through which the electron beam travels prior to its radiation into free space.

A still further object of the present invention is to provide an arrangement for displacing an electromagnetic beam wherein the control mechanism consists of an interacting acoustic wave signal whose relative direction may be readily varied.

A yet still further object of the present invention is to provide apparatus for shifting the direction of an acoustic beam which employs an acoustic wave which varies the characteristics of a portion of the medium through which said first beam travels.

Figure 2:
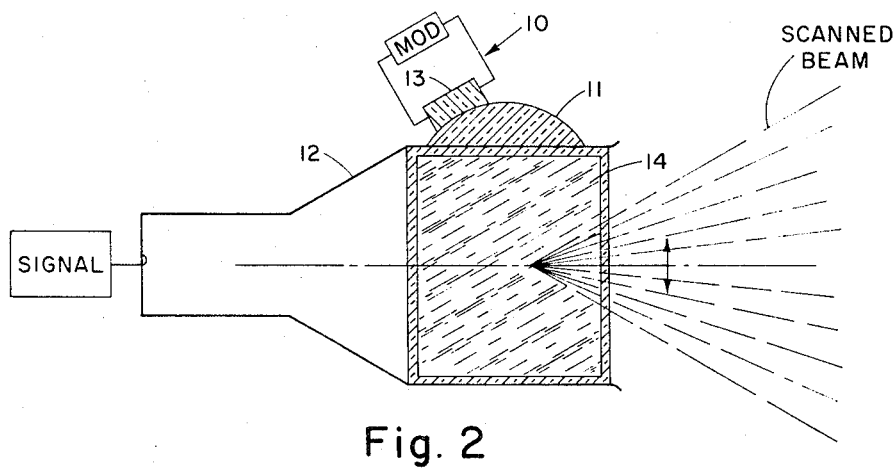
Figure 3:
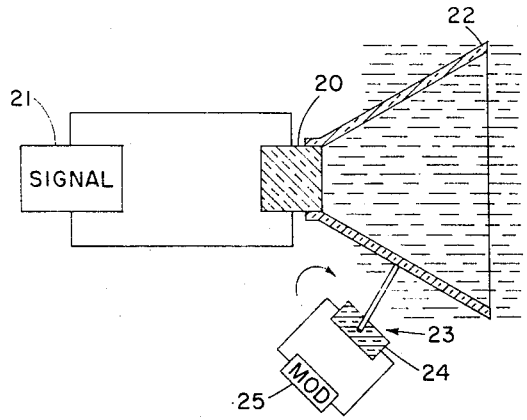

Other objects, advantages and novel features of the invention will become apparent from the following detailed description of the invention when considered in conjunction with the accompanying drawings wherein:

FIG. 1 schematically illustrates one embodiment of the present invention for achieving conical scanning of an electromagnetic beam;

FIG. 2 illustrates an alternative arrangement for sector scanning an electromagnetic beam; and FIG. 3 illustrates a sonic arrangement for displacing a sound beam.

Referring now to FIG. 1 of the drawings which schematically depicts one simple arrangement for achieving, for example, a conical scanning of an electromagnetic beam, a wave guide horn 1, which acts as the radiator and beam forming apparatus, has coupled to its input end 2 a suitable signal source 3 in accordance with conventional practices. Accommodated within the flared end 4 of this horn and occupying a portion thereof is an enclosed frustoconically shaped container 5 filled with an electrolyte 6, such as, for example, salt water. Container 5, it will be appreciated, is made of a dielectric material that is transparent to both electromagnetic and sound wave energy. Thus, electromagnetic wave energy propagating down the feed portion of the wave guide horn can proceed through the parallel, opposite wall portions of the container and the electrolytic solution and then pass into free space without suffering appreciable attenuation.

Rotatably mounted on the external, conical wall portion of horn 1 is a sound generator 7, which may take the form, for example, of a suitable piezoelectric crystal 8, and a signal energization source 9 driving it. Since the sound wave energy radiated from crystal 8 must penetrate the confronting wall portion of the wave guide horn, this part of the radiator should be made of a material that conducts this type of energy. As is well known, any suitable intermediate layer of material may be interposed between the face of the radiating crystal and the adjacent surface of the horn to provide a proper acoustic impedance transition.

In the operation of the apparatus of FIG. 1, electromagnetic wave energy propagating down the feed portion of the horn passes through the rear wall of container 5 and enters the electrolytic solution 6. If sound generator 7 is inoperative at this time, this energy proceeds on a direct course through the solution, then through the front wall of container 5, and out the mouth of the horn into free space, with the main axis of the radiated beam coincidental with the longitudinal axis of symmetry of the horn. However, if sound generator 7 is energized, the radiated sound wave perturbs the electrolyte 6 and, as mentioned hereinbefore, there is set up within the solution a pattern of stratified zones where the conductivity and index of refraction is higher and lower than that normally encountered when the solution is unexcited. These individual zones and layers, which are all parallel to each other, have a spatial orientation with respect to the wave fronts of the electromagnetic wave energy which is established, in this modification, by the slope of the flared wall portion of the wave guide horn. When electromagetic wave energy encounters these zones or discontinuities, it is refracted in a manner similar to the Bragg reflection encountered in optical systems, emerging out into free space at a predetermined acute angle with respect to the longitudinal axis of symmetry of the wave guide horn. Thus, the radiated electromagnetic beam is displaced from its normal or on-axis position. To obtain a coherent effect and enhance the radiated beams, directionality, as mentioned hereinbefore, the wavelengths of the acoustic and electromagnetic wave energy as measured in the electrolytic solution should be integrally related.

In order to accomplish, for example, conical scanning in the arrangement of FIG. 1, it is only necessary to rotate sound generator 7 cyclically around the flared section of the wave guide horn. It will be appreciated that when this generator is on top of the horn, as viewed in FIG. 1, the radiated electromagnetic beam is upwardly displaced from the longitudinal axis of the horn a predetermined angular amount, whereas when the generator is rotated 180° to the bottom of the horn, the radiated electromagnetic beam is deflected downwardly to the same angular amount. Consequently, as the sound generator travels around the flared mouth of the horn, the electromagnetic beam performs a conical scanning motion.

In FIG. 2 there is illustrated a simple arrangement for achieving a sector scan wherein the acoustic generator 10 cooperates with a convex dielectric lens 11 secured to the top wall of wave guide horn 12. From what has been said hereinbefore it should be recognized that when crystal 13 of sound generator 10 is in the position shown the electromagnetic energy passing through the electrolyte solution 14 is refracted upwardly, emerging from the mouth of the horn at an acute angle depending upon the radius of curvature of the convex surface of lens 11. As crystal 13 travels over the convex surface of this lens from one end thereof to the other, the electromagnetic beam shifts from an upper off-axis position to an on-axis position and then down to a lower off-axis position. Consequently, any apparatus for oscillating sound generator 10 back and forth over the curved surface of lens 11 will produce sector scanning of the radiated electromagnetic beam.

In FIG. 3 there is shown a simple arrangement for changing the direction of radiation of a sound beam. Here, a suitable sound generating crystal 20, driven by a signal source 21 electrically coupled thereto, cooperates with a beam forming horn 22 which may, for example, be immersed in a salt water environment. Mounted on the lower wall, for example, of horn 22 so as to be capable of pivotable movement is a sound generator 23, including a crystal 24 and an energization source 25. From the previous description of the operation of FIGS 1 and 2, it should be apparent that the sound beam radiated from horn 22 can be directionally controlled and, for example, swept back and forth in space by appropriate movements of sound generator 23. This movement of the sound generating source 23, like previous cases, causes the sound energy radiated therefrom to enter the interior of horn 22 at different angles with respect to the longitudinal axis of symmetry of the horn. Thus, the stratified zones mentioned hereinbefore, produced in that volume of the salt water which is within the mouth portion of the horn, assume different angular relationships with respect to the sound wave energy generated by crystal 20, and the interaction results in the displacement of the latter energy as it emerges from the mouth of the horn.

It would be pointed out that the particular details of the electromagnetic beam forming apparatus or the sound generator are a matter of choice and that the important consideration is that the system include an electrolytic solution for providing the interaction zone between the propagating energy which is to be directionally controlled and the cooperating sound energy which is to act as the mechanism for accomplishing this.

Also, if desired, the systems above disclosed may include a suitable acoustic reflecting means on the opposite side of the radiator from the sound generator to create a standing wave pattern within the electrolyte so as to cause the stratified layers to remain relatively stationary.

Obviously many modifications and variations of the present invention are possible in the light of the above teachings. It is therefore to be understood that within the scope of the appended claims the invention may be practiced otherwise than as specifically described.

What is claimed is:

1. Electromagnetic wave energy radiating apparatus comprising, in combination,
   a wave guide horn;
   means for coupling a signal to the feed end of said horn;
   a volume of fluid accommodated within the mouth portion of said horn; and
   means for sending sound wave energy through said fluid at controllable angles with respect to the longitudinal axis of symmetry of said horn, thereby to control the direction in which said signal is radiated as it emerges from said fluid and from the mouth of said horn.

2. In an arrangement as defined in claim 1 wherein said fluid is an electrolyte solution.

3. In an arrangement as defined in claim 1,
   wherein the wave length of said signal and the wave length of said sound wave energy as measured within said fluid are integrally related.

4. In an arrangement as defined in claim 1,
   wherein said wave guide horn has a conically shaped mouth portion; and
   wherein said means for sending sound wave energy through said fluid includes a sound generator cooperating with the external wall of said conically shaped mouth portion.

5. In an arrangement as defined in claim 4,
   wherein said sound wave generator can be moved in a circumferential manner around the external wall of said conically shaped mouth portion, thereby to cause the major axis of the electromagnetic wave energy beam radiated from said horn to be displaced in a conical scanning pattern.

6. In an arrangement as defined in claim 1, wherein said means for sending the sound wave energy through said fluid includes
 a sound wave generator externally mounted on said wave guide horn; and
 means for changing the orientation of said sound wave generator with respect to the longitudinal axis of symmetry of said horn.

References Cited

UNITED STATES PATENTS

| | | | |
|---|---|---|---|
| 3,121,169 | 2/1964 | Benton | 333—30 |
| 3,234,488 | 2/1966 | Fair | 333—30 |
| 3,292,114 | 12/1966 | Mason | 333—30 |

ELI LIEBERMAN, *Primary Examiner.*

U.S. Cl. X.R.

343—783, 911